United States Patent
Lettkeman et al.

(10) Patent No.: US 9,123,987 B2
(45) Date of Patent: Sep. 1, 2015

(54) ANTENNA MOUNTING SYSTEMS AND METHODS

(75) Inventors: David Michael Lettkeman, Parker, CO (US); Adam Michael Frank, Denver, CO (US)

(73) Assignee: DISH NETWORK L.L.C., Englewood, CO (US)

( * ) Notice: Subject to any disclaimer, the term of this patent is extended or adjusted under 35 U.S.C. 154(b) by 278 days.

(21) Appl. No.: 13/563,537

(22) Filed: Jul. 31, 2012

(65) Prior Publication Data
US 2014/0033496 A1 Feb. 6, 2014

(51) Int. Cl.
- H01Q 1/00 (2006.01)
- H01Q 1/12 (2006.01)
- F16M 13/02 (2006.01)

(52) U.S. Cl.
CPC .............. *H01Q 1/1221* (2013.01); *F16M 13/02* (2013.01); *Y10T 29/49826* (2015.01); *Y10T 29/53* (2015.01)

(58) Field of Classification Search
CPC .......... B23P 19/04; B23P 19/00; B23P 11/00; B23P 6/00; B23P 15/00; H01Q 1/1221; H01Q 1/1228; H01Q 1/125; F16B 1/00–1/02; F16B 3/00–3/04; F16B 9/00; F16M 13/00; F16M 13/02
USPC ............... 29/700; 248/218.4, 219.4; 348/878, 348/880, 882, 890, 892
See application file for complete search history.

(56) References Cited

U.S. PATENT DOCUMENTS

| | | |
|---|---|---|
| 1,994,998 A | 3/1935 | Hull |
| 3,347,505 A | 10/1967 | Menser |
| 3,392,848 A | 7/1968 | McConnell et al. |
| 3,728,796 A | 4/1973 | Lobaugh |
| 4,174,821 A | 11/1979 | Levine |
| 4,203,639 A | 5/1980 | Mohr et al. |

(Continued)

FOREIGN PATENT DOCUMENTS

| | | |
|---|---|---|
| JP | 2000-049516 A | 2/2000 |
| JP | 2002-374108 A | 12/2002 |

(Continued)

OTHER PUBLICATIONS

Definition of Integral—Merriam Webster.*

(Continued)

*Primary Examiner* — Alexander P Taousakis
*Assistant Examiner* — Lee A Holly
(74) *Attorney, Agent, or Firm* — Kilpatrick Townsend & Stockton LLP (57) ABSTRACT

An apparatus for coupling an object to a surface is disclosed. The apparatus may include a mounting plate, a mounting bracket, and a locking plate. The mounting plate may include a mounting portion configured to be coupled with the surface, a receptacle portion configured to receive a mounting bracket, and at least one protrusion extending from the mounting portion. The mounting bracket may include a backing portion, and a coupling portion. The backing portion may define at least one aperture configured to receive the at least one protrusion when the mounting bracket is disposed in the receptacle portion of the mounting plate. The coupling portion may be configured to be coupled with the object, which may be an antenna. The locking plate may be configured to be disposed between at least a portion of the at least one protrusion and at least a portion of the backing portion.

19 Claims, 7 Drawing Sheets

(56) References Cited

U.S. PATENT DOCUMENTS

| | | | |
|---|---|---|---|
| 4,358,096 A | 11/1982 | Paton et al. | |
| 4,361,375 A | 11/1982 | Bailey et al. | |
| 4,500,064 A | 2/1985 | Calabro | |
| 4,535,689 A | 8/1985 | Putkowski | |
| 4,546,549 A | 10/1985 | Duperon | |
| 4,589,213 A | 5/1986 | Woodward | |
| 4,598,297 A | 7/1986 | Hawkins | |
| 4,698,640 A | 10/1987 | Redman | |
| 4,850,114 A | 7/1989 | Vockins | |
| 4,858,865 A | 8/1989 | Schrepfer | |
| 4,858,878 A | 8/1989 | Gassaway | |
| 4,888,875 A | 12/1989 | Strother | |
| 4,908,949 A | 3/1990 | Jaccard | |
| 4,934,706 A | 6/1990 | Marshall | |
| 5,002,216 A * | 3/1991 | Gerber | 224/329 |
| 5,063,679 A | 11/1991 | Schwandt | |
| 5,149,277 A | 9/1992 | LeMaster | |
| 5,154,000 A | 10/1992 | Mahoney et al. | |
| 5,167,075 A | 12/1992 | Weldy et al. | |
| 5,306,165 A | 4/1994 | Nadeau | |
| 5,359,820 A | 11/1994 | McKay | |
| 5,574,256 A | 11/1996 | Cottone | |
| 5,617,680 A | 4/1997 | Beatty | |
| 5,738,020 A * | 4/1998 | Correia | 109/51 |
| 5,886,673 A | 3/1999 | Thomas | |
| 5,947,752 A | 9/1999 | Wu | |
| 5,963,010 A | 10/1999 | Hayashi et al. | |
| 5,963,179 A | 10/1999 | Chavez | |
| 5,974,218 A | 10/1999 | Nagasaka et al. | |
| 6,180,878 B1 | 1/2001 | Gretz | |
| 6,262,691 B1 | 7/2001 | Austin et al. | |
| 6,273,377 B1 | 8/2001 | Archer | |
| 6,281,929 B1 | 8/2001 | Fimoff | |
| 6,293,035 B1 | 9/2001 | LaPointe | |
| 6,361,007 B1 | 3/2002 | Oby et al. | |
| 6,366,253 B1 * | 4/2002 | Hemmingsen, II | 343/760 |
| 6,375,161 B2 | 4/2002 | Garceau | |
| 6,385,856 B1 | 5/2002 | Godin | |
| 6,396,459 B1 | 5/2002 | Pullman | |
| 6,404,405 B2 | 6/2002 | Wanat | |
| 6,427,348 B1 | 8/2002 | Webb | |
| 6,438,751 B1 | 8/2002 | Voyticky et al. | |
| 6,445,361 B2 | 9/2002 | Liu et al. | |
| 6,450,464 B1 | 9/2002 | Thomas | |
| 6,460,821 B1 | 10/2002 | Rhudy et al. | |
| 6,532,675 B2 | 3/2003 | Letourneau | |
| 6,727,861 B2 | 4/2004 | Antoine | |
| 6,731,250 B1 | 5/2004 | Berman | |
| 6,734,830 B1 | 5/2004 | Bickham | |
| 6,766,992 B1 | 7/2004 | Parker | |
| 6,768,474 B2 | 7/2004 | Hunt | |
| 6,777,611 B2 | 8/2004 | Ewald et al. | |
| 6,834,435 B2 | 12/2004 | Turner | |
| 6,873,304 B1 | 3/2005 | Malhotra | |
| 6,905,060 B2 * | 6/2005 | Van Aken et al. | 228/112.1 |
| 6,996,911 B1 | 2/2006 | Dinius | |
| 7,000,746 B2 | 2/2006 | Mackin et al. | |
| 7,027,006 B2 | 4/2006 | Holle | |
| D522,967 S | 6/2006 | St. Clair | |
| 7,057,575 B2 | 6/2006 | Malhotra | |
| 7,106,082 B2 | 9/2006 | Yoshioka | |
| 7,106,273 B1 | 9/2006 | Brunson et al. | |
| 7,122,738 B2 | 10/2006 | Kanamaru | |
| 7,220,129 B1 | 5/2007 | Nishijima et al. | |
| 7,253,785 B2 | 8/2007 | Holle | |
| 7,260,920 B2 | 8/2007 | Weir | |
| 7,435,901 B2 | 10/2008 | Mori et al. | |
| 7,456,802 B1 | 11/2008 | Bourgeois | |
| 7,460,081 B2 | 12/2008 | Holle | |
| 7,554,036 B1 | 6/2009 | DeCosta | |
| 7,555,842 B1 | 7/2009 | Asay | |
| 7,563,131 B2 | 7/2009 | Sullivan et al. | |
| 7,592,719 B2 | 9/2009 | Hoopes | |
| D603,342 S | 11/2009 | DeCosta | |
| 7,648,379 B2 | 1/2010 | Johnson et al. | |
| 7,651,353 B2 | 1/2010 | Laukhuf | |
| 7,683,853 B2 | 3/2010 | Michaelis | |
| 7,692,094 B1 | 4/2010 | DeCosta | |
| 7,730,517 B1 | 6/2010 | Rey et al. | |
| 7,739,711 B2 | 6/2010 | Finseth et al. | |
| 7,741,562 B2 | 6/2010 | Crotinger et al. | |
| D632,545 S | 2/2011 | DeCosta | |
| 7,918,425 B2 | 4/2011 | Rathbone et al. | |
| 7,997,546 B1 | 8/2011 | Anderson et al. | |
| 8,011,628 B1 | 9/2011 | Suddeth | |
| 8,015,929 B2 | 9/2011 | Tyner | |
| D647,488 S | 10/2011 | DeCosta | |
| 8,061,051 B2 | 11/2011 | Allemand | |
| 8,081,139 B2 | 12/2011 | Schmidt et al. | |
| 8,336,221 B2 | 12/2012 | Steele et al. | |
| 8,339,329 B2 | 12/2012 | Shen | |
| 8,350,153 B1 | 1/2013 | DeCosta | |
| D678,840 S | 3/2013 | DeCosta | |
| D684,935 S | 6/2013 | DeCosta | |
| 8,462,075 B2 | 6/2013 | Lettkeman | |
| 8,646,186 B2 | 2/2014 | Lettkeman et al. | |
| 8,698,692 B2 | 4/2014 | Lettkeman | |
| 8,780,008 B2 | 7/2014 | Lettkeman et al. | |
| 8,819,743 B2 | 8/2014 | Kirchner | |
| 8,907,862 B2 | 12/2014 | Lettkeman | |
| 2002/0003504 A1 | 1/2002 | Yoshida et al. | |
| 2002/0067591 A1 | 6/2002 | Tajima | |
| 2002/0105476 A1 | 8/2002 | Overton | |
| 2002/0190172 A1 | 12/2002 | Oddsen, Jr. | |
| 2003/0086023 A1 | 5/2003 | Chung et al. | |
| 2003/0229900 A1 | 12/2003 | Reisman | |
| 2004/0149475 A1 | 8/2004 | Gorin | |
| 2004/0248462 A1 | 12/2004 | Dyer et al. | |
| 2005/0001781 A1 | 1/2005 | Antoine | |
| 2005/0007241 A1 | 1/2005 | Kline et al. | |
| 2005/0101183 A1 | 5/2005 | McCoy et al. | |
| 2005/0101336 A1 | 5/2005 | Otsuka | |
| 2005/0250375 A1 | 11/2005 | Allison | |
| 2006/0053447 A1 | 3/2006 | Krzyzanowski et al. | |
| 2006/0067066 A1 | 3/2006 | Meier et al. | |
| 2006/0248553 A1 | 11/2006 | Mikkelson et al. | |
| 2007/0192798 A1 | 8/2007 | Morgan | |
| 2007/0210978 A1 | 9/2007 | Zihlman | |
| 2008/0117091 A1 | 5/2008 | Binder | |
| 2008/0233794 A1 | 9/2008 | Clark et al. | |
| 2008/0271331 A1 | 11/2008 | Allemand | |
| 2009/0052122 A1 | 2/2009 | Johnson et al. | |
| 2009/0056970 A1 | 3/2009 | Hoffman et al. | |
| 2009/0067621 A9 | 3/2009 | Wajs | |
| 2009/0124113 A1 | 5/2009 | Sexton et al. | |
| 2009/0150940 A1 | 6/2009 | St. John-Larkin | |
| 2009/0165058 A1 | 6/2009 | Kirchner | |
| 2009/0251880 A1 | 10/2009 | Anderson | |
| 2009/0315804 A1 | 12/2009 | Schmidt et al. | |
| 2010/0031295 A1 | 2/2010 | Krzyzanowski et al. | |
| 2010/0046194 A1 | 2/2010 | Yang et al. | |
| 2010/0075540 A1 | 3/2010 | Liao | |
| 2010/0141379 A1 | 6/2010 | Tucker et al. | |
| 2010/0147580 A1 | 6/2010 | Koesterich | |
| 2010/0177010 A1 | 7/2010 | Michaelis | |
| 2010/0219183 A1 | 9/2010 | Azancot et al. | |
| 2011/0021066 A1 | 1/2011 | Squires | |
| 2011/0032172 A1 | 2/2011 | Kirby et al. | |
| 2011/0032175 A1 | 2/2011 | Kang | |
| 2011/0083399 A1 | 4/2011 | Lettkeman et al. | |
| 2011/0156984 A1 * | 6/2011 | Caldwell et al. | 343/890 |
| 2011/0187624 A1 | 8/2011 | Lettkeman et al. | |
| 2011/0205142 A1 | 8/2011 | Lettkeman | |
| 2011/0259883 A1 | 10/2011 | DeCosta | |
| 2012/0137530 A1 | 6/2012 | Yun | |
| 2012/0151785 A1 | 6/2012 | Lettkeman et al. | |
| 2012/0162044 A1 * | 6/2012 | Lettkeman et al. | 343/880 |
| 2012/0256496 A1 | 10/2012 | DeCosta | |
| 2012/0256809 A1 | 10/2012 | Lettkeman | |
| 2012/0261529 A1 | 10/2012 | Lettkeman | |
| 2013/0056259 A1 | 3/2013 | Lettkeman | |
| 2013/0256480 A1 | 10/2013 | Lettkeman | |
| 2014/0090260 A1 | 4/2014 | Lettkeman et al. | |

(56) References Cited

U.S. PATENT DOCUMENTS

2014/0174816 A1 6/2014 Lettkeman
2014/0252182 A1 9/2014 Lettkeman et al.
2014/0366078 A1 12/2014 Kirchner

FOREIGN PATENT DOCUMENTS

KR 2000-0047707 A 7/2000
WO 2014/022087 2/2014

OTHER PUBLICATIONS

Definition of Curve—Merriam Webster.*
U.S. Appl. No. 12/979,597, filed Dec. 28, 2010, Non-Final Office Action mailed Mar. 28, 2014, 12 pages.
U.S. Appl. No. 13/226,929, filed Sep. 7, 2011, Final Office Action mailed Feb. 12, 2014, 30 pages.
U.S. Appl. No. 13/226,929, filed Sep. 7, 2011, Notice of Allowance mailed Mar. 31, 2014, 16 pages.
U.S. Appl. No. 12/328,082, filed Dec. 4, 2008, Non Final Office Action mailed Jan. 14, 2011, 19 pages.
U.S. Appl. No. 12/328,082, filed Dec. 4, 2008, Non Final Office Action mailed Nov. 15, 2011, 18 pages.
U.S. Appl. No. 12/328,082, filed Dec. 4, 2008, Non Final Office Action mailed Apr. 20, 2012, 13 pages.
U.S. Appl. No. 12/328,082, filed Dec. 4, 2008, Final Office Action mailed Oct. 26, 2012, 16 pages.
U.S. Appl. No. 12/328,082, filed Dec. 4, 2008, Non Final Office Action mailed Jul. 8, 2013, 16 pages.
U.S. Appl. No. 12/328,082, filed Dec. 4, 2008, Final Office Action mailed Dec. 5, 2013, 13 pages.
U.S. Appl. No. 12/328,082, filed Dec. 4, 2008, Notice of Allowance mailed Apr. 16, 2014, 24 pages.
Author Unknown, "BMI Measuring Instruments," Accessed on Mar. 13, 2011, 9 pages.
Author Unknown, "Stanley Hand Tools, 77-009—IntelliPoint Plus Level," Accessed Mar. 13, 2011, 1 page.
Author Unknown, "Checkpoint U6 V-Groove Level," Chads Tool Box.com, Accessed Mar. 13, 2011, 6 pages.
Midlite Corporation, "The Power Jumper, HDTV Power Relocation Kit," Nov. 10, 2011, www.Midlite.com, 1 page.
Powerbridge, "3D Power Cable Total Solution Connector Kit Model #TSCK Power Extension Cable Mangement," 2 pages.
"Powerbridge In-Wall Power Extension System Home," accessed at http://www.powerbridgesolution.com on Sep. 7, 2011, 4 pages.
Legrand, "Flat SCreen TV Cord and Cable Power Kit—CMK70," 2011, 1 page.
Author Unknown, Treestand Manual, Locon Treestands, LLC, Waterford, Ohio, known to exist on Oct. 13, 2009, 2 pages. Accessed at http://www.locontreestands . . .
International Search Report and Written Opinion of PCT/US2010/052431, mailed Jun. 10, 2011, 7 pages.
Home Depot, "PowerBridge Ultra Low Profile In-Wall System", Oct. 18, 2013, 2 pages. Retrieved from: http://www.homedepot.com/catalog/pdfImages/ef/ef60a932-d90e-4a49-aa33-576da0d6feb6.pdf.
Sewell, "DataComm Flat Panel TV Cable Organizer Remodeling Kit with Power Outlet", Feb. 13, 2009, 1 page. Retrieved from: http://sewelldirect.com/Recessed-Cable-Plate-Remodeling-Kit-with-Electrical-Outlet.asp.
U.S. Appl. No. 13/085,210, filed Apr. 12, 2011 Non-Final Office Action mailed Mar. 27, 2013, 11 pages.
U.S. Appl. No. 13/084,632, filed Apr. 12, 2011, Non-Final Rejection mailed Jun. 3, 2013, 9 pages.
U.S. Appl. No. 12/483,016, filed Jun. 11, 2009, Notice of Allowance mailed Nov. 8, 2011, 8 pages.
International Search Report and Written Opinion of PCT/US2008/086423 mailed on May 11, 2008, 14 pages.
U.S. Appl. No. 13/085,210, filed Apr. 12, 2011 Final Office Action mailed Oct. 25, 2013, 12 pages.
U.S. Appl. No. 12/711,103, filed Feb. 23, 2010, Notice of Allowance mailed Feb. 12, 2013, 13 pages.
U.S. Appl. No. 12/711,103, filed Feb. 23, 2010, Non-Final Office Action mailed Aug. 1, 2012, 16 pages.
U.S. Appl. No. 13/893,304, filed May 13, 2013, Non-Final Office Action mailed Aug. 1, 2013, 10 pages.
U.S. Appl. No. 13/893,304, filed May 13, 2013, Notice of Allowance mailed Dec. 2, 2013, 23 pages.
U.S. Appl. No. 13/081,364, filed Apr. 6, 2011, Non-Final Office Action mailed Apr. 25, 2013, 12 pages.
U.S. Appl. No. 12/578,367, filed Oct. 13, 2009, Final Office Action mailed Nov. 19, 2012, 10 pages.
U.S. Appl. No. 12/578,367, filed Oct. 13, 2009, Non-Final Office Action mailed May 14, 2012, 12 pages.
U.S. Appl. No. 12/578,367, filed Oct. 13, 2009, Final Office Action mailed Jan. 31, 2012, 11 pages.
U.S. Appl. No. 12/578,367, filed Oct. 13, 2009, Non-Final Office Action mailed Sep. 20, 2011, 21 pages.
U.S. Appl. No. 12/970,749, filed Dec. 16, 2010, Non-Final Office Action mailed May 16, 2013, 13 pages.
U.S. Appl. No. 12/970,749, filed Dec. 16, 2010, Final Office Action mailed Feb. 6, 2013, 15 pages.
U.S. Appl. No. 12/970,749, filed Dec. 16, 2010, Non-Final Office Action mailed Sep. 14, 2012, 16 pages.
U.S. Appl. No. 12/970,749, filed Dec. 16, 2010, Notice of Allowance mailed Sep. 5, 2013, 9 pages.
U.S. Appl. No. 13/084,632, filed Apr. 12, 2011, Notice of Allowance mailed Nov. 18, 2013, 23 pages.
U.S. Appl. No. 13/226,929, filed Sep. 7, 2011, Non-Final Office Action mailed Jun. 28, 2013, 31 pages.
International Search Report and Written Opinion of PCT/US2013/050597 mailed Jan. 10, 2014, 17 pages.
Intellectual Property Office of the Republic of China (Taiwan) for ROC Pat App. No. 097149159, Final Office Action dated Dec. 13, 2012, 9 pages.
U.S. Appl. No. 13/085,210, filed Apr. 12, 2011, Notice of Allowance mailed Aug. 8, 2014, 20 pages.
U.S. Appl. No. 12/970,749, filed Dec. 16, 2010, Notice of Allowance mailed Apr. 16, 2014, 24 pages.
U.S. Appl. No. 12/979,597, filed Dec. 28, 2010, Final Office Action mailed Sep. 17, 2014, 16 pages.
U.S. Appl. No. 13/084,632, filed Apr. 12, 2011, Notice of Allowance mailed Mar. 6, 2014, 15 pages.
U.S. Appl. No. 14/098,294, filed Dec. 5, 2013, Non Final Office Action mailed Mar. 13, 2014, 15 pages.
U.S. Appl. No. 14/098,294, filed Dec. 5, 2013, Notice of Allowance mailed Jul. 30, 2014, 21 pages.
U.S. Appl. No. 14/193,641, filed Feb. 28, 2014, Non-Final Office Action mailed Feb. 28, 2014, 36 pages.
International Preliminary Report on Patentability for PCT/US2013/050597 mailed Feb. 12, 2015, 6 pages.
Intellectual Property Office of the Republic of China (Taiwan) for ROC Pat App. No. 097149159, Office Action dated Sep. 19, 2014, 20 pages.
U.S. Appl. No. 12/979,597, filed Dec. 28, 2010, Non Final Office Action mailed Mar. 30, 2015, 17 pages.
U.S. Appl. No. 14/465,588, filed Aug. 21, 2014, Non-Final Office Action mailed May 7, 2015, 22 pages.
U.S. Appl. No. 14/188,408, filed Feb. 24, 2014 Non-Final Office Action mailed May 21, 2015, 23 pages.

* cited by examiner

ANTENNA MOUNTING SYSTEMS AND METHODS

BACKGROUND

Known methods for coupling antennas with buildings typically involve bolting or screwing the antenna and/or related coupling members directly to a building such that the coupling is not easily reversible. This can cause unwanted and unsightly damage to a building in the circumstance that the attachment needs to be undone. Furthermore, if the antenna and/or related coupling members need to be repaired or replaced, it can delay such maintenance. In some cases, the prior mounting point may even become unusable for attachment of a new antenna.

BRIEF DESCRIPTION

In one embodiment, an apparatus for coupling an object to a surface is provided. The apparatus may include a mounting plate, a mounting bracket, and a locking plate. The mounting plate may include a mounting portion configured to be coupled with the surface, a receptacle portion configured to receive a mounting bracket, and at least one protrusion extending from the mounting portion. The mounting bracket may include a backing portion, where the backing portion defines at least one aperture which is configured to receive the at least one protrusion when the mounting bracket is disposed in the receptacle portion of the mounting plate, and a coupling portion, where the coupling portion is configured to be coupled with the object, which may be an antenna. The locking plate may be configured to be disposed between at least a portion of the at least one protrusion and at least a portion of the backing portion.

In another embodiment, an apparatus coupling an object to a surface is provided. The apparatus may include a mounting plate, a mounting bracket, and a locking plate. The mounting plate may be coupled with the surface, where the mounting plate includes at least one protrusion and a receptacle portion. The mounting bracket may be disposed in the receptacle portion of the mounting plate, where the mounting bracket is coupled with the object, and where the at least one protrusion extend through at least one aperture in the mounting bracket. The locking plate may be disposed between the at least one protrusion and hold the mounting bracket against the mounting plate.

In another embodiment, a method for coupling an object to a surface is provided. The method may include coupling a mounting plate with the surface. The mounting plate may include a receptacle portion configured to receive a mounting bracket and at least one protrusion extending from the mounting portion. The method may also include disposing a mounting bracket into the receptacle. The method may further include rotating the mounting bracket so that a backing portion of the mounting bracket is flush with the mounting plate and the at least one protrusion extends through apertures in the mounting bracket. The method may additionally include disposing a locking plate in between at least a portion of the at least one protrusion and the mounting bracket.

In the appended figures, similar components and/or features may have the same numerical reference label. Further, various components of the same type may be distinguished by following the reference label by a letter that distinguishes among the similar components and/or features. If only the first numerical reference label is used in the specification, the description is applicable to any one of the similar components and/or features having the same first numerical reference label irrespective of the letter suffix.

DETAILED DESCRIPTION

The ensuing description provides exemplary embodiments only, and is not intended to limit the scope, applicability or configuration of the disclosure. Rather, the ensuing description of the exemplary embodiments will provide those skilled in the art with an enabling description for implementing one or more exemplary embodiments. One of skill in the art will understand that various changes may be made in the function and arrangement of elements without departing from the spirit and scope of the invention as set forth in the appended claims. For example, elements of any one discussed embodiment may or may not be incorporated into any other discussed embodiment.

Specific details are given in the following description to provide a thorough understanding of the embodiments. However, it will be understood by one of ordinary skill in the art that the embodiments may be practiced without these specific details. For example, well-known structures and techniques may be shown and discussed without unnecessary detail in order to avoid obscuring the embodiments. In yet another example, any step performed by any system or method herein may or may not occur in all embodiments, or may be performed in a different order than explicitly disclosed.

In one embodiment described herein, an apparatus for coupling an object to a surface is provided. The object may be a satellite television antenna such as a parabolic antenna or other type of antenna. In some embodiments, the object or antenna may include related structural coupling members such as a mounting arm. That is, the object or antenna may be coupled with a mounting arm, and the mounting arm may be coupled with the apparatuses described herein. The apparatuses described herein may include a mounting plate, a mounting bracket, and a locking plate.

The mounting plate may include a mounting portion configured to be coupled with the surface, a receptacle portion configured to receive a mounting bracket, and at least one protrusion extending from the mounting portion. Each of these pieces may be made from any number of materials, including metals such as steel or aluminum.

The mounting portion may be configured to be coupled with the surface in any number of ways. In one embodiment, the mounting plate may have apertures, possibly countersunk or counterbored, allowing mechanical fasteners such as screws or bolts to be used to couple the mounting plate the surface. In yet other embodiments, the mounting plate may be glued or otherwise adhered to the surface. These mounting plates may not have apertures. Embodiments that have apertures for mechanical couplings may also be adhered to a surface by merely ignoring the apertures. In some embodiments, the mounting plate may protrusions on the backside of the plate to allow for coupling with the structure of a building during construction of the building.

In one embodiment, the receptacle portion of the mounting plate may constitute an upturned edge of the mounting portion. In other embodiments, the receptacle portion may constitute an additional fabrication coupled with the mounting portion. The receptacle portion may be shaped so that it is capable of accepting the mounting bracket when the mounting bracket is disposed therein. In some embodiments, the receptacle portion may be configured to accept an entire bottom edge of the mounting bracket. In other embodiments, only a portion of the bottom edge of the mounting bracket may be accepted by the receptacle portion. For example, the bottom edge of the mounting bracket may have flanges at the ends of the bottom edge, thereby allowing for the bottom edge to be centered when disposed in the receptacle portion. Various potential details will be discussed in reference to the figures below.

The protrusions of the mounting plate may extend away axially and perpendicularly from the front face of the mounting portion (the back face being the face that is adhered/coupled with the surface). The protrusions may be mushroom shaped such that the first portion of the protrusion proximate to the front face is narrower than the second portion of the protrusion distal to the front face. While the first and/or second portion of the protrusion may be round, other shapes are possible. The first portion may be of a length (away from the front face) equal to or greater than the thickness of the mounting bracket and the locking plate for reasons discussed below. Both the first portion and the second portion may be circular in cross section. Other cross sectional shapes are possible.

The mounting bracket may include a backing portion and a coupling portion. The backing portion may be of a size such that when the mounting bracket is disposed within the receptacle portion of the mounting plate, its size approximately matches the mounting portion (it does not significantly overhang the mounting portion). The backing portion may define at least one aperture which may be configured to receive the at least one protrusion when the mounting bracket is disposed in the receptacle portion of the mounting plate. In many embodiments, the number of apertures will match the number of protrusions on the mounting plate.

The coupling portion of the mounting bracket may have any number of features which allow for the attachment of an object or antenna with the mounting bracket. In some embodiments, an arm member may couple with the coupling portion, and the object/antenna may couple with the object/antenna. Any number of individual pieces may join the object/antenna with the coupling portion of the mounting bracket. In some embodiments, the coupling portion may extend away perpendicular to the plane of the backing portion. These or other portions of the coupling portion may define or bracket/surround the outer ends of an edge of the backing portion which is configured to be disposed in the receptacle portion.

The locking plate may be configured to be disposed between at least a portion of the at least one protrusion and at least a portion of the backing portion when the mounting bracket is disposed in the receptacle portion of the mounting plate and flush thereto. The locking plate may include apertures which are configured to go over the mushroom shaped protrusions, and then slide parallel in the plane of the backing portion and mounting portion such that a smaller portion of the apertures engages the narrower portion of the mushroom shaped protrusions. Details of such an embodiment will be discussed below in reference to the figures.

In this manner, the bulbous portion of the mushroom shaped protrusions holds the locking plate against the backing portion of the mounting bracket, which is in turn held against the mounting portion of the mounting plate. Thus, the mounting bracket is secured against the surface to which the mounting plate is secured to. This allows for a reversible connection of the object/antenna to the surface. In one embodiment, all that is required to remove the object/antenna from the surface is to remove the locking plate, then pull the mounting bracket off the mounting plate. In some embodiments, the locking plate may include a removal protrusion to assist in removing it from the apparatus. This removal protrusion may be grasped by a tool such as pliers to assist in removal.

In another embodiment described herein, an apparatus coupling an object to a surface is provided. Many of these embodiments will be fully assembled versions of the embodiments discussed above. As above, the apparatus may include a mounting plate, a mounting bracket, and a locking plate. The mounting plate may be coupled with the surface, where the mounting plate includes at least one protrusion and a receptacle portion. The mounting bracket may be disposed in the receptacle portion of the mounting plate, where the mounting bracket is coupled with the object/antenna, and where the at least one protrusion extend through at least one aperture in the mounting bracket. The locking plate may be disposed between the at least one protrusion and hold the mounting bracket against the mounting plate.

In another embodiment described herein, a method for coupling an object to a surface is provided. Many of these embodiments will be methods of employing the apparatuses discussed above. In some embodiments, a kit of the mounting plate, the mounting bracket, and the locking plate will be provided. The method may include coupling a mounting plate with the surface. The mounting plate may include a receptacle portion configured to receive a mounting bracket and at least one protrusion extending from the mounting portion. The method may also include disposing a mounting bracket into the receptacle. The method may further include rotating the mounting bracket so that a backing portion of the mounting bracket is flush with the mounting plate and the at least one protrusion extends through apertures in the mounting bracket. The method may additionally include disposing a locking plate in between at least a portion of the at least one protrusion and the mounting bracket.

Figures 1A, 1B:
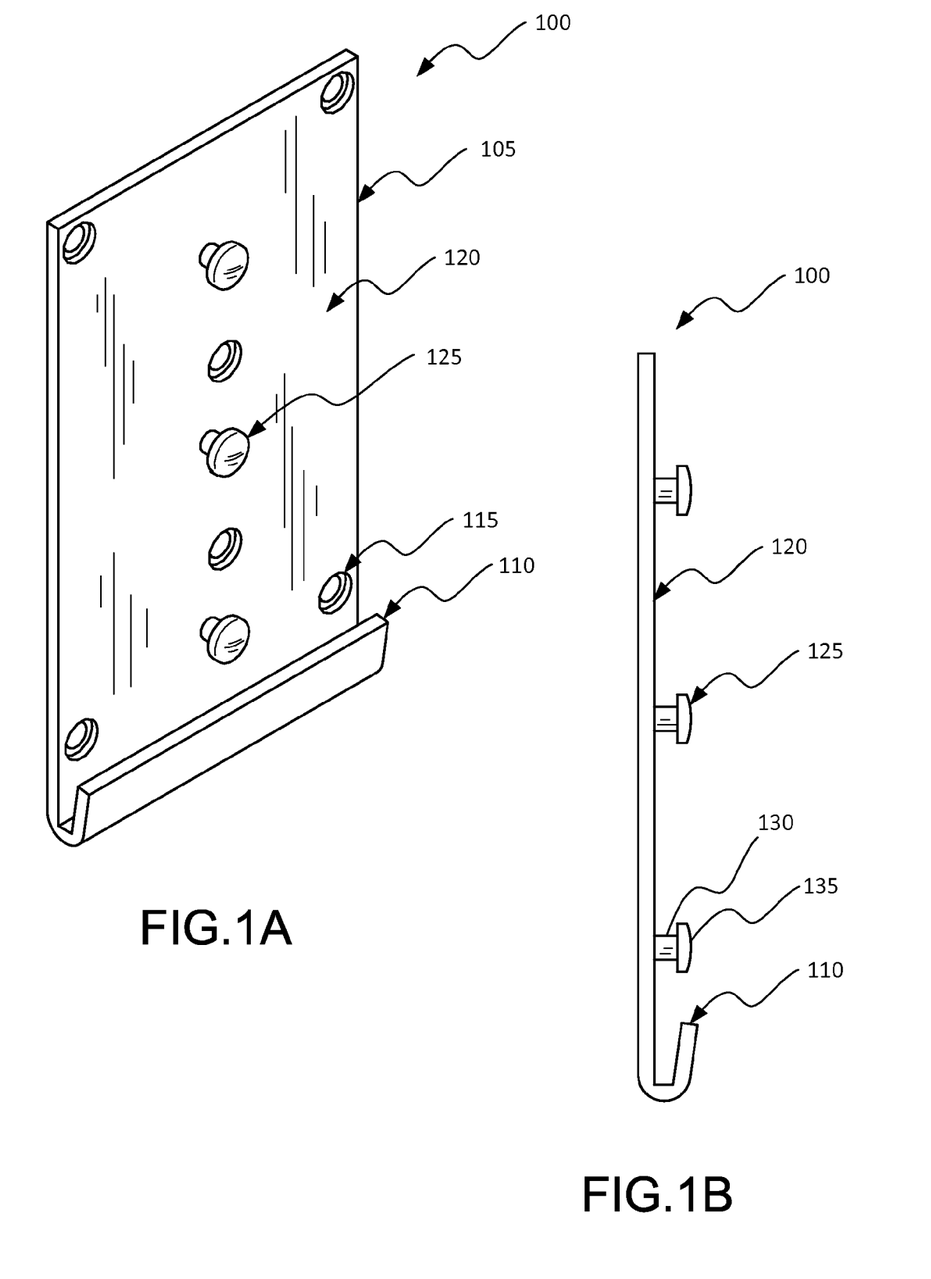
FIG. 1A is an axonometric view of a mounting plate.
FIG. 1B is a side view of a mounting plate.

Turning now to FIG. 1, an axonometric view of a mounting plate 100 is shown. FIG. 1B shows a side view of mounting plate 100. Mounting plate 100 may include a mounting portion 105 and a receptacle portion 110. Receptacle portion 110 in this embodiment is a bent up portion of mounting portion 105.

Mounting portion 105 may include two or more counterbored apertures 115 to assist in coupling mounting plate to a surface (multiple possible locations shown in FIG. 1). Adhesive may also be used in this embodiment, and apertures 115 ignored. Apertures 115 are counterbored or countersunk to allow for a flush front face 120 of mounting portion 105 to remain after coupling via mechanical fasteners, thereby allowing the backing portion of the mounting bracket to sit flush against front face 120.

Mounting portion 105 may also include multiple mushroom shaped protrusions 125. As described above, the first portion 130 of protrusions 125 may be smaller in size or diameter than the second portion 135 of protrusions 125. The distance, axially, from front face 120 to second portion 135 may be at least at long as the mounting bracket and locking plate are thick, combined.

Figure 2:
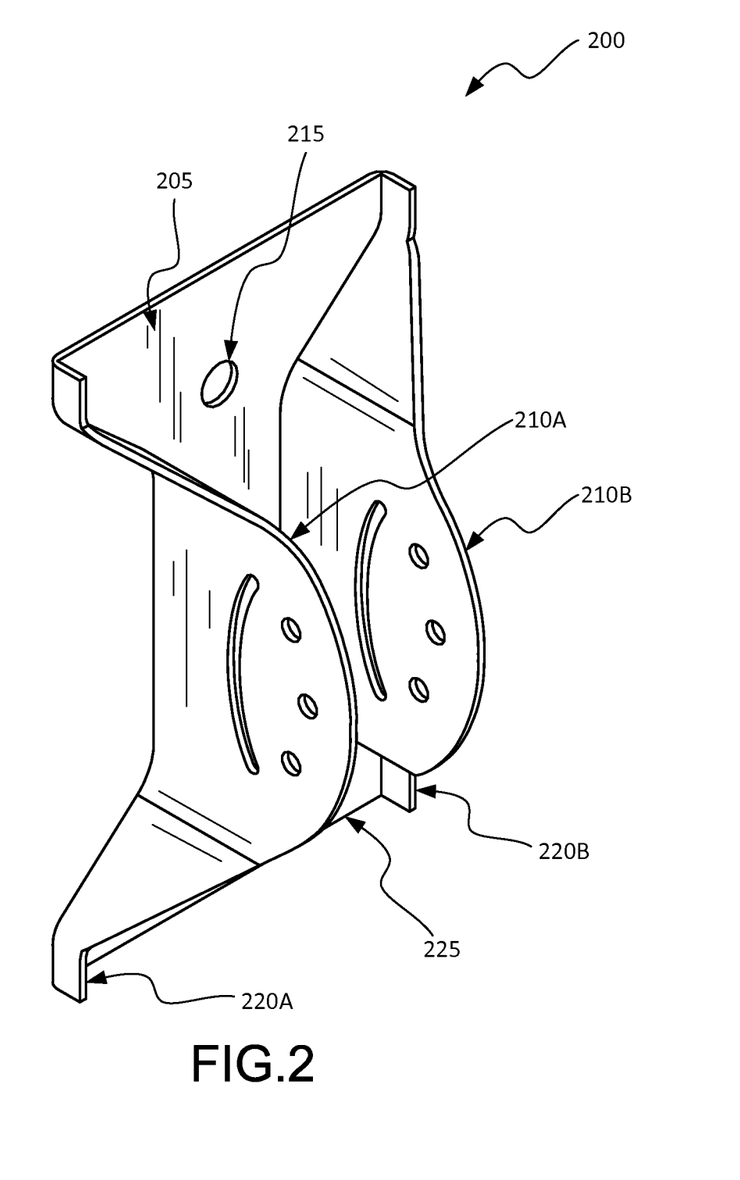
FIG. 2 is an axonometric view a mounting bracket.

FIG. 2 shows an axonometric view a mounting bracket 200. Mounting bracket 200 may include a backing portion 205 and a mounting portion 210. Mounting portion 210 may include, in this embodiment, two portions 210A, 210B which extend perpendicularly away from backing portion 205. Backing portion may include apertures 215 which match, relative to each other, the locations of protrusions 125. The location of apertures 215 may also match the locations of protrusions 125 relative to the bottom or seat of receptacle portion 110. Mounting portion 210 may include any apertures or mechanisms necessary to couple mounting portion 210 with an object/antenna or other intermediary members coupling to an object/antenna. Portions 220 of mounting portion 210 may bracket or frame the bottom edge 225 of backing portion which will be disposed in receptacle portion 110 of mounting plate 100.

Figure 3:
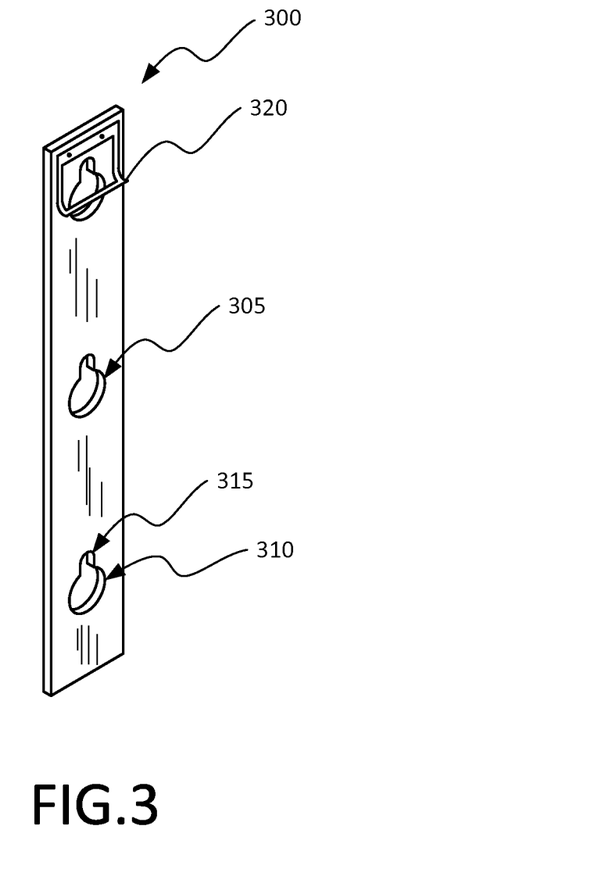
FIG. 3 is an axonometric view of a locking plate.

FIG. 3 shows an axonometric view of a locking plate 300. Locking plate 300 may have upside down keyhole shaped apertures 205. Keyhole shaped apertures 205 may include a first portion 210 at least as large as second portion 135 of protrusions 125 to allow protrusions 125 to pass therethrough. A second portion 315 of keyhole shaped apertures 205 may be smaller than first portion 310, but at least as large as first portion 130 of protrusions 125 to allow locking plate to be slid laterally with respect to protrusions 125 thereby engaging second portion 315 around first portion 130 of protrusion 125, and behind second portion 135 of protrusion 125.

Locking plate 300 may also include a locking mechanism 320 to ensure locking plate 300 is not inadvertently dislodged from the apparatus after being engaged. In this embodiment, locking mechanism 320 is a flat spring with a curved end which allows protrusions 125 to pass through, and become locked once protrusions 123 are engaged with the second portion 315 of keyhole shaped apertures 205. To disengage locking plate 300 from the apparatus, locking mechanism 320 is lifted at its curved portion to allow protrusions 125 to pass underneath. Other types of locking mechanisms may be present in this or other embodiments, including an aperture through locking plate 300 which allows a screw to engage both the locking plate and an additional aperture on mounting plate 100. Either one of these additional apertures could be threaded to match a locking screw used therein.

Figure 4A:
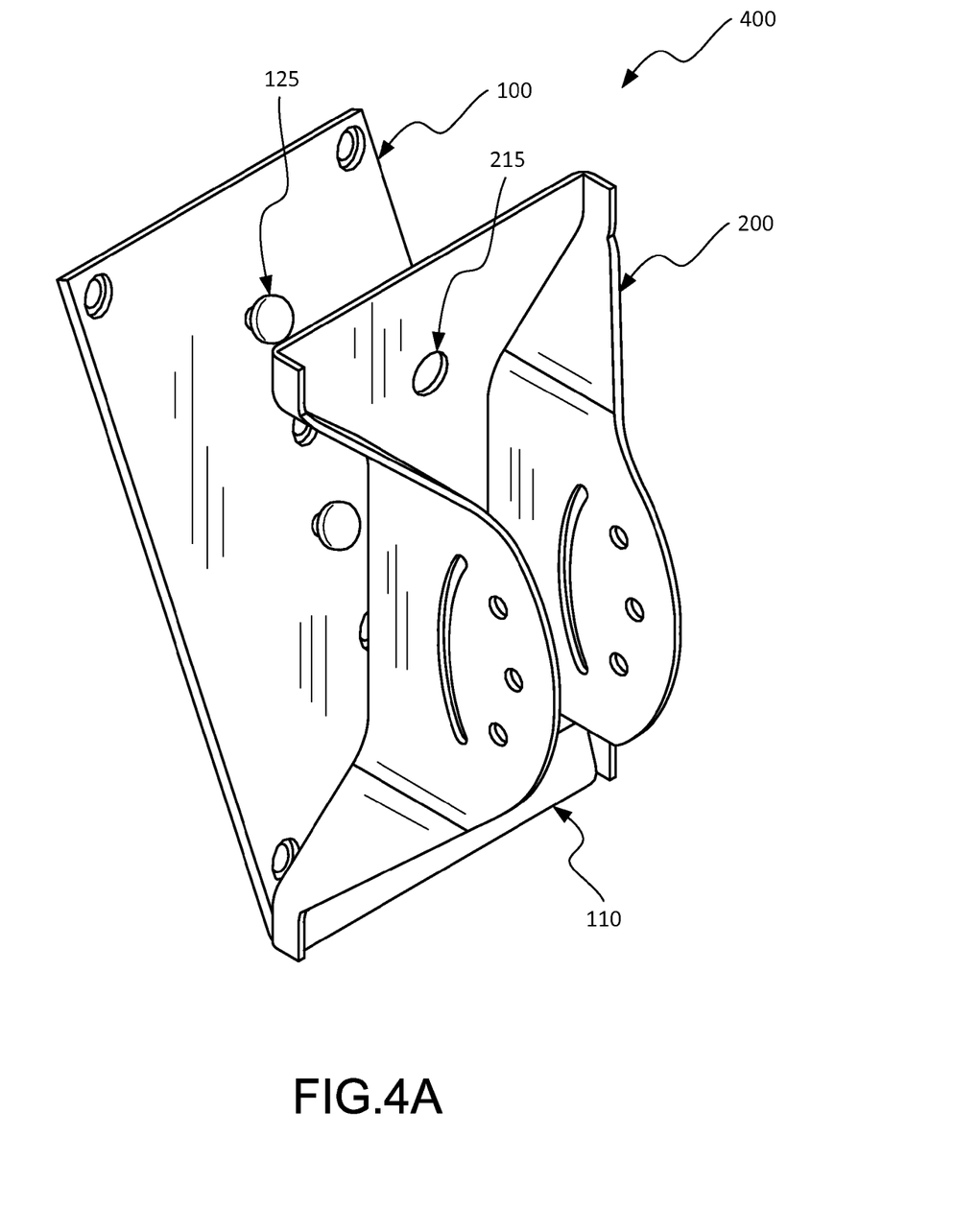
FIG. 4A is an axonometric view of a mounting bracket inserted into the receptacle portion of a mounting plate.

FIG. 4A shows an axonometric view 400 of mounting bracket 200 inserted into receptacle portion 110 of mounting plate 100. This will usually occur after mounting plate 100 has been coupled with the target surface. The fit of lower edge 225 of mounting bracket 200 into receptacle portion 110 may be configured so that various levels of interference between lower edge and receptacle portion 110 are created upon insertion.

Figure 4B:
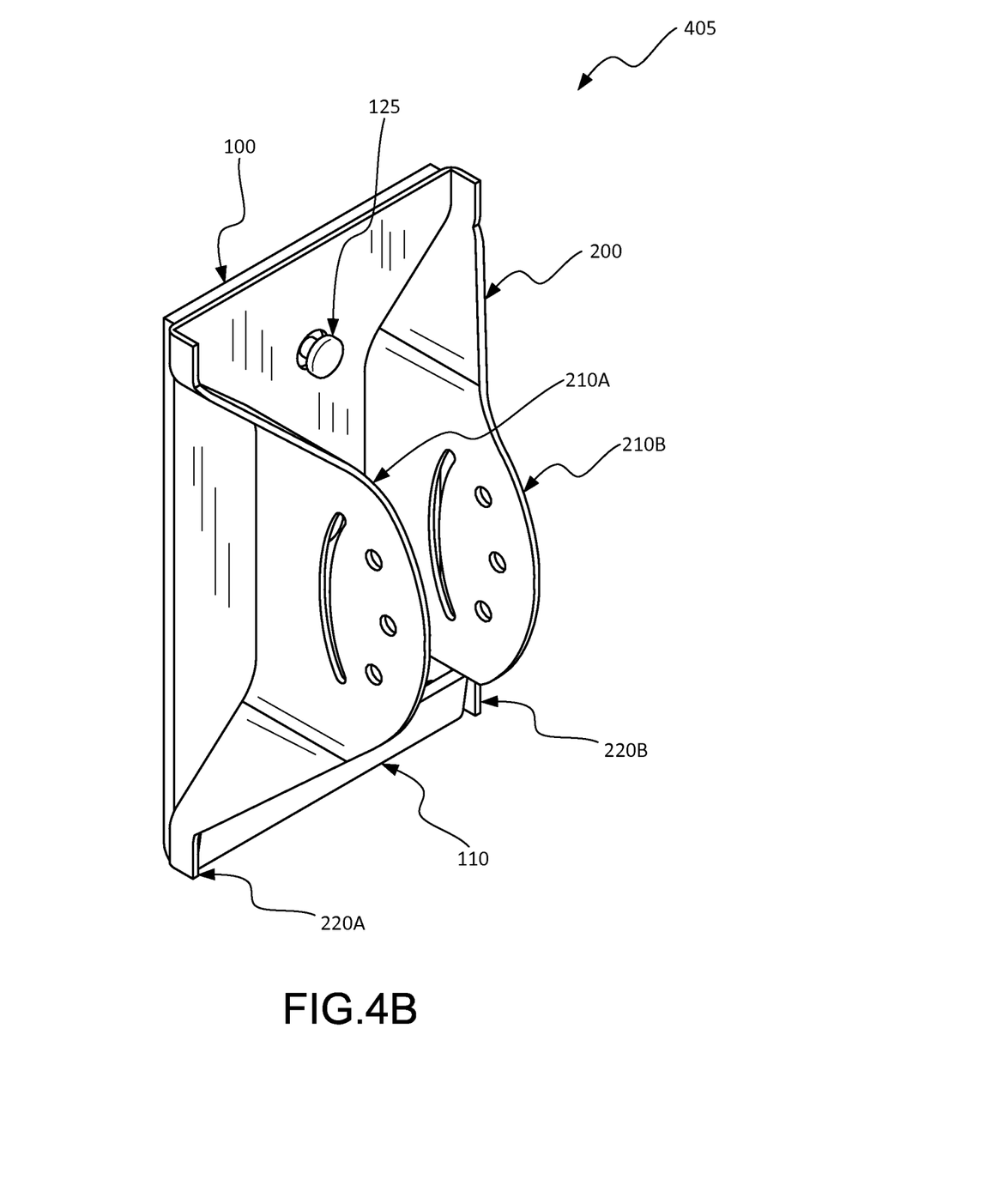
FIG. 4B is an axonometric view of a mounting bracket fully inserted and rotated in the receptacle portion of a mounting plate.

Once inserted, mounting bracket 200 may be rotated so that the back face of mounting bracket 200 is flush with front face 120 of mounting plate 100. When this is done, protrusions 125 may penetrate through apertures 215. FIG. 4B shows an axonometric view 405 of mounting bracket 200 fully inserted and rotated in receptacle portion 110 of mounting plate 100. As discussed previously, portions 220 of mounting portion 210 may bracket bottom edge 225, and now receptacle portion 110, thereby centering mounting bracket 200 on mounting plate 100 (protrusions 125 also assist in this matter).

Figure 4C:
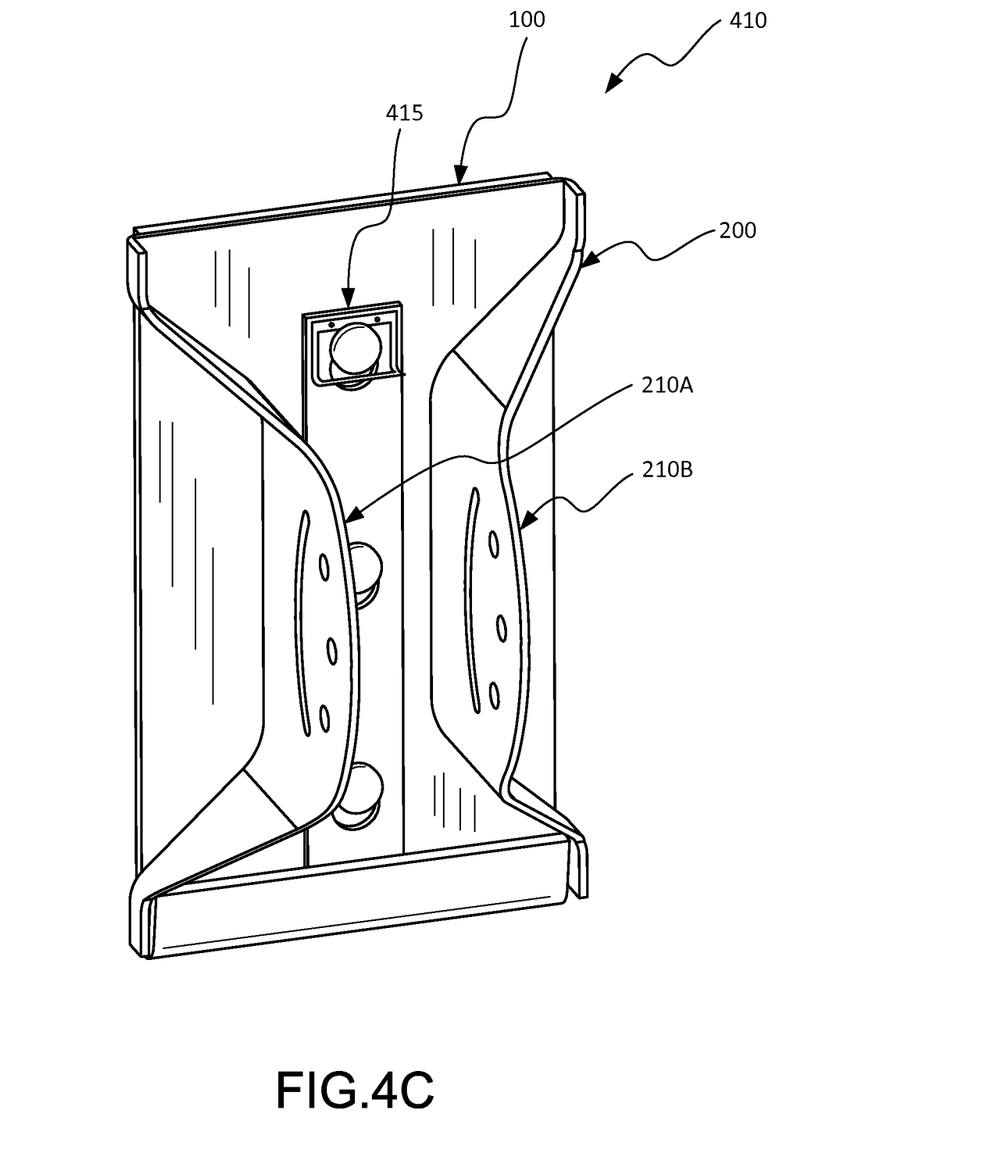
FIG. 4C is an axonometric view of a locking plate disposed into the assembly of FIG. 4B.
Figure 5:
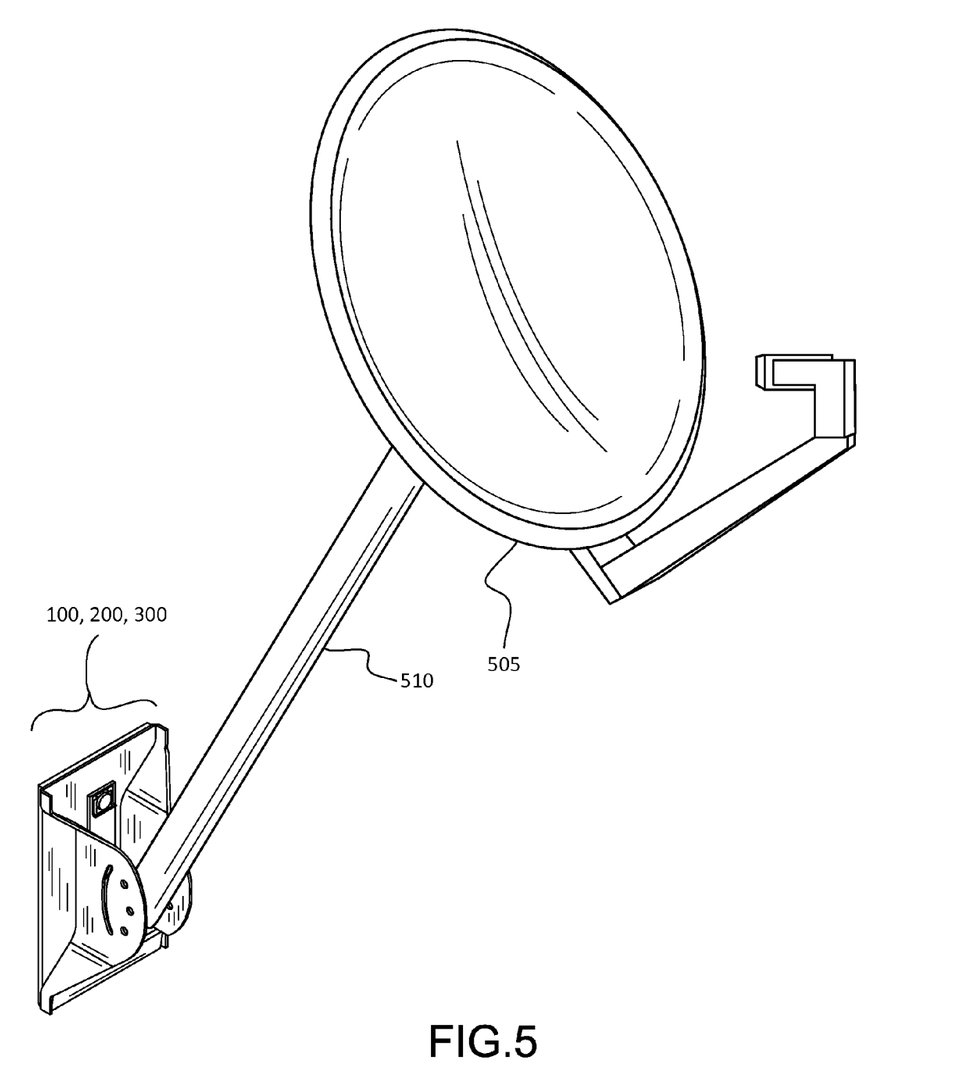
FIG. 5 is an axonometric view of the assembly of FIG. 4C with a parabolic antenna coupled thereto.

FIG. 4C shows an axonometric view 410 of a locking plate 415 disposed into the assembly of FIG. 4B. As shown, locking plate has been disposed onto mounting bracket such that second portion 315 of apertures 305 are behind second portion 135 of protrusions 125, thereby locking mounting bracket 200 flush into place against mounting plate 100, and providing a mounting location for an object/antenna (via mounting portion 210). FIG. 5 shows an axonometric view 500 of the assembly 100, 200, 300 of FIG. 4C with a parabolic antenna 500 coupled thereto via an arm 510.

Other objects would could be attached to a surface with the apparatus described herein include, merely by way of example, and not by way of limitation, signage, flag poles, armaments, recording devices such as cameras and microphones, temporary or permanent structural members, awnings, networking and communication devices, lightning rods, flat or curved mirrors, lighting, plants, payment collection devices, dispensing devices, etc.

Multiple embodiments have now been described in detail for the purposes of clarity and understanding. However, it will be appreciated that certain changes and modifications may be practiced within the scope of the appended claims.

What is claimed is:

1. An apparatus for coupling an object to a surface, wherein the apparatus comprises:
    a mounting plate, wherein the mounting plate comprises:
        a mounting portion that is integral with the mounting plate;
        a receptacle portion that: is integral with the mounting plate; has a protruding pocket-shaped portion that extends along a bottom edge of the mounting plate; the protruding portion receives a bottom edge of a mounting bracket, and the protruding portion allows the mounting bracket to be rotated toward the surface until flush with the mounting plate while the mounting bracket is fully inserted into the protruding pocket-shaped portion; and
        at least one protrusion that is integral with the mounting plate and extends from the mounting plate;
    the mounting bracket, wherein the mounting bracket comprises:
        a backing portion, wherein the backing portion defines at least one aperture, and the at least one aperture receives the at least one protrusion when the mounting bracket is fully inserted into the protruding pocket-shaped portion of the receptacle portion of the mounting plate, the at least one aperture of the mounting bracket positioned to allow the mounting bracket to rotate toward the surface until flush with the mounting plate while the mounting bracket is fully inserted into the protruding pocket-shaped portion and to allow the at least one protrusion to pass through the at least one aperture during such rotation; and
    a locking plate, wherein the locking plate is configured to be disposed between at least a portion of the at least one protrusion and at least a portion of the backing portion of the mounting bracket.

2. The apparatus for coupling an object to a surface of claim 1, wherein the mounting plate comprises a first end and a second end, and the receptacle portion is located at the first end.

3. The apparatus for coupling an object to a surface of claim 2, wherein the first end is above the second end when the mounting portion is coupled with the surface.

4. The apparatus for coupling an object to a surface of claim 1, wherein the receptacle portion is at least as wide as the backing portion is thick, and wherein the mounting bracket being disposed in the receptacle portion of the mounting plate comprises the backing portion being disposed in the receptacle portion.

5. The apparatus for coupling an object to a surface of claim 1, wherein the mounting portion being configured to be coupled with the surface comprises the mounting portion defining at least one aperture countersinked or counterbored from a side of the mounting plate having the receptacle portion.

6. The apparatus for coupling an object to a surface of claim 1, wherein the at least one protrusion comprises a mushroom shaped protrusion.

7. The apparatus for coupling an object to a surface of claim 6, wherein the locking plate defines at least one keyhole shaped aperture having a first portion with a diameter sufficient to accept the mushroom shaped protrusion, and a second portion with a width smaller than the diameter.

8. The apparatus for coupling an object to a surface of claim 1, wherein the locking plate, when disposed between at least a portion of the at least one protrusion and at least a portion of the backing portion, at least partially prevents movement of the mounting bracket in an axial direction of the protrusions.

9. The apparatus for coupling an object to a surface of claim 1, wherein the at least one protrusion comprises a plurality of protrusions.

10. An apparatus for coupling an object to a surface, wherein the apparatus comprises:
    a mounting plate, wherein the mounting plate comprises:
        at least one protrusion that is integral with the mounting plate; and
        a receptacle portion that has a curved receptacle that extends from an end of the mounting plate and receives a bottom edge of a mounting bracket and the curved receptacle allows the mounting bracket to be rotated toward the surface until flush with the mounting plate while the mounting bracket is inserted into the curved receptacle;
    the mounting bracket that has an edge for positioning in the curved receptacle and rotating such that a backing portion of the mounting bracket is made flush with the mounting plate, wherein:
        when the mounting bracket is made flush with the mounting plate, the at least one protrusion extends through at least one aperture in the mounting bracket, and
        the at least one aperture of the mounting bracket is positioned to allow the mounting bracket to rotate toward the surface until flush with the mounting plate while the mounting bracket is inserted into the curved receptacle and to allow the at least one protrusion to pass through the at least one aperture during such rotation; and
    a locking plate for being disposed between the at least one protrusion and holding the mounting bracket against the mounting plate.

11. The apparatus for coupling an object to a surface of claim 10, wherein the apparatus further comprises:
    an arm coupled with the mounting bracket; and
    the object coupled with the arm.

12. The apparatus for coupling an object to a surface of claim 11, wherein the object comprises an antenna.

13. The apparatus for coupling an object to a surface of claim 10, wherein the surface is a vertical surface.

14. The apparatus for coupling an object to a surface of claim 10, wherein the mounting plate being coupled with the surface comprises the mounting plate being adhered to the surface or being coupled with mechanical fasteners to the surface.

15. A method for coupling an object to a surface, wherein the method comprises:
    coupling a mounting plate with the surface, wherein the mounting plate comprises:
        a receptacle that has a bent-shaped portion that is integral with and extends from an end of the mounting plate, and that is configured to receive a mounting bracket; and
        at least one protrusion that is integral with and extends from the mounting plate;
    inserting an end of a mounting bracket into the bent-shaped portion of the receptacle;
    rotating the mounting bracket so that a backing portion of the mounting bracket is flush with the mounting plate and the at least one protrusion extends through apertures in the mounting bracket; and
    disposing a locking plate in between at least a portion of the at least one protrusion and the mounting bracket.

16. The method for coupling an object to a surface of claim 15, wherein coupling the mounting plate with the surface comprises adhering or mechanically coupling the mounting plate to the surface.

17. The method for coupling an object to a surface of claim 15, wherein there is an interference fit between the mounting plate and the mounting bracket when the end of the mounting bracket is inserted into the bent-shaped portion of the receptacle.

18. The method for coupling an object to a surface of claim 15, wherein disposing the locking plate in between at least a portion of the at least one protrusion and the mounting bracket comprises disposing the locking plate axially over the protrusions, then moving the locking plate laterally.

19. The method for coupling an object to a surface of claim 15, wherein the protrusions are mushroom shaped and the locking plate comprise at least one keyhole shaped aperture having a first portion with a diameter sufficient to accept the mushroom shaped protrusion, and a second portion with a width smaller than the diameter, and disposing the locking plate in between at least a portion of the at least one protrusion and the mounting bracket comprises disposing the protrusions through the first portion, and sliding the locking plate such that the second portion is underneath the mushroom shaped protrusion.

* * * * *